United States Patent [19]

Ito

[11] Patent Number: 4,905,734

[45] Date of Patent: Mar. 6, 1990

[54] REFRIGERANT TRANSPORTING HOSE

[75] Inventor: Tomohide Ito, Kasugai, Japan

[73] Assignee: Tokai Rubber Industries, Ltd., Aichi, Japan

[21] Appl. No.: 273,978

[22] Filed: Nov. 21, 1988

[30] Foreign Application Priority Data

Nov. 28, 1987 [JP] Japan .................... 62-300685

[51] Int. Cl.$^4$ .............................................. F16L 11/08
[52] U.S. Cl. .................................... 138/126; 138/125;
138/137; 138/DIG. 1; 428/36.1; 428/36.2;
428/36.8; 428/36.91; 428/215; 428/414;
428/492; 428/493; 428/494; 428/495;
428/475.5
[58] Field of Search ............... 428/36.1, 36.2, 36.8,
428/36.91, 215, 414, 492, 494, 475.5, 495, 493;
138/124, 125, 126, 137, DIG. 2; 525/138

[56] References Cited

U.S. PATENT DOCUMENTS

| | | | |
|---|---|---|---|
| 2,564,602 | 9/1948 | Hurst | 138/127 |
| 2,800,145 | 5/1953 | Pierls et al. | 138/137 |
| 2,899,982 | 6/1957 | Harpfer | 138/126 |
| 3,528,260 | 8/1968 | Binder | 138/126 |
| 3,932,559 | 1/1976 | Cantor et al. | 525/344 |
| 3,941,738 | 3/1976 | Denda et al. | 525/138 |
| 3,951,887 | 4/1976 | Tanimura et al. | 525/138 |
| 4,209,042 | 6/1980 | Buan | 138/126 |
| 4,330,017 | 5/1982 | Satoh et al. | 138/126 |
| 4,633,912 | 1/1987 | Pilkington et al. | 428/36.2 |
| 4,734,305 | 3/1988 | Sugimoto et al. | 428/36.2 |

FOREIGN PATENT DOCUMENTS

| | | | |
|---|---|---|---|
| 2002099 | 1/1982 | Japan | 428/36.2 |
| 60-91082 | 5/1985 | Japan . | |
| 61-6482 | 1/1986 | Japan . | |

Primary Examiner—Ellis P. Robinson
Assistant Examiner—Archene A. Turner
Attorney, Agent, or Firm—Oliff & Berridge

[57] ABSTRACT

A refrigerant transporting hose having an inner tube including an inner and an outer rubber layer and an intermediate resin layer interposed between the inner and outer rubber layers; an outer tube formed of a rubber material located radially outwardly of the inner tube; and a reinforcing fiber layer interposed between the inner and outer tubes, such that the reinforcing fiber layer and the inner and outer tubes constitute an integral tubular body. The inner tube further includes a first adhesive layer for bonding the inner rubber layer and the intermediate resin layer to each other, and a second adhesive layer for bonding the intermediate resin layer and the outer rubber layer to each other. The first and second adhesive layers consist essentially of at least one elastomer, and at least one resin selected from the group consisting of phenolic resin and epoxy resin.

7 Claims, 1 Drawing Sheet

REFRIGERANT TRANSPORTING HOSE

BACKGROUND OF THE INVENTION

1. Field of the Invention

The present invention generally relates to a refrigerant transporting hose and particularly to such hoses suitable for providing piping for car coolers, air conditioners and the like which are employed in automotive vehicles.

2. Related Art Statement

Referring to FIG. 2, there is shown a known hose for transporting or conducting a refrigerant such as Freon (fluorohydrocarbon). The hose has a three-laminated or layered structure consisting of an inner and an outer rubber tube 101, 103 and a reinforcing fiber layer 102 interposed between the inner and outer tubes 101, 103. The inner rubber tube 101 is formed of acrylonitrile-butadiene rubber (NBR), chlorosulfonated polyethylene rubber (CSR) or the like, the reinforcing fiber layer 102 is formed of polyester fiber, vinylon fiber (polyvinyl alcohol synthetic fiber) or the like, and the outer rubber tube 103 is formed o ethylene propylene diene rubber (EPDM), chloroprene rubber (CR) or the like. Reference numerals 115 designate spiking holes which are formed through the outer rubber tube 103 so as to communicate the reinforcing fiber layer 102 with outside space. The spiking holes 115 serve to relieve a portion of the refrigerant that has permeated the inner rubber tube 101, into the outside space, thereby preventing the hose from being swollen due to the refrigerant otherwise being trapped between the intermediate fiber layer 102 and the inner and/or outer rubber tubes 101, 103. Consequently, the hose is free from the problem of separation or peeling of each of the three laminates (two tubes and one layer) from the others due to the trapped refrigerant. Being formed of rubber material except for the reinforcing fiber layer 102, the hose has a high flexibility. Accordingly, the hose can be handled with ease, for example to provide piping. Furthermore, the rubber hose has an excellent seal characteristic, so that the hose is connected to a joint such as a nipple with high gas tightness. Rubber materials, however, have a comparatively high gas permeability, that is, a comparatively low resistance to gas permeation therethrough. Therefore, the rubber hose suffers from the problem of leakage of the refrigerant gas conveyed therethrough (especially where Freon whose molecular weight is comparatively low is used as the refrigerant).

Referring to FIG. 3, there is shown another known refrigerant transporting hose including an innermost layer 204 formed of a polyamide resin, such as nylon 6, which has a high resistance to gas permeation. The innermost resin layer 204 and a rubber layer 205 formed of a rubber material such as NBR disposed outside the resin layer 204, corresponding to the inner rubber tube 101 of the hose of FIG. 2. This hose further includes a reinforcing fiber layer 202 formed on the outer surface of the rubber layer 205 and an outer rubber tube 203 formed on the outer surface of the reinforcing fiber layer 202. Reference numerals 215 designate spiking holes similar to those 115 of the hose of FIG. 2. Having the innermost resin layer 204 formed of nylon or other polyamide resins that have a high resistance to gas permeation, the hose does not allow leakage of the refrigerant even if Freon with a comparatively low molecular weight is used as the refrigerant. However, the hose has a comparatively low flexibility because of the rigidity of the polyamide resin constituting the resin layer 204. Accordingly, it is not easy to handle the hose, for example, to provide piping for a refrigerant-using device or apparatus. Moreover, the prior art hose suffers from the problem that the polyamide resin layer 204 is deteriorated or damaged due to metallic ions and/or metallic salts developed from metallic piping. Furthermore, although the resin layer 204 and rubber layer 205 of the hose of FIG. 2 are bonded to each other with satisfactory bonding strength by an adhesive which typically contains a phenolic resin or a mixture of a phenolic resin and an epoxy resin, the adhesive layer becomes considerably rigid after being cured. Accordingly, the cured adhesive layer is low in impact resistance, whereby the adhesive layer has a high tendency to be fractured or broken upon exertion thereto of bending stress. When the adhesive layer is fractured, the resin layer 204 may be fractured together therewith because the resin layer 204 is in close contact with the adhesive layer. Accordingly, where the prior art hose is used in a condition wherein the hose is subject to bending stress, there is the possibility that the resin layer 204 is fractured together with the adhesive layer due to bending stress, thus leading to leakage of the refrigerant conducted through the hose.

As is apparent from the foregoing, none of the conventional refrigerant transporting hoses are satisfactory in quality.

SUMMARY OF THE INVENTION

It is therefore an object of the present invention to provide a refrigerant transporting hose which has a high resistance to gas permeation, a high flexibility and an excellent seal characteristic.

The above object can be accomplished according to the principle of the present invention, which provides a refrigerant transporting hose comprising (a) an inner tube including an inner and an outer rubber layer and an intermediate resin layer interposed between the inner and outer rubber layers; (b) an outer tube of a rubber material located radially outwardly of the inner tube; and (c) a reinforcing fiber layer interposed between the inner tube and the outer tube, such that the reinforcing fiber layer and the inner and outer tubes constitute an integral tubular body, the inner tube further including a first adhesive layer for bonding the inner rubber layer and the intermediate resin layer to each other, and a second adhesive layer for bonding the intermediate resin layer and the outer rubber layer to each other, the first and second adhesive layers essentially consisting of at least one elastomer, and at least one resin selected from the group consisting of phenolic resin and epoxy resin.

In the refrigerant transporting hose of the present invention constructed as described above, the inner tube has a three-laminated or layered structure, that is, is constituted by the inner and outer rubber layers and the intermediate resin layer interposed therebetween, whereby the resin layer is not directly exposed to the inside space. Consequently, the resin layer is protected against deterioration due to metallic ions or other harmful matters. Moreover, since the resin layer is bonded to the inner and outer rubber layers with the respective adhesive layers that are increased in impact resistance because of consisting essentially of at least one resin and at least one elastomer, the resin layer is free from fracture that has conventionally been encountered upon fracture of the adhesive layer due to bending stress exerted thereto.

Furthermore, the hose has a high resistance to gas permeation (that is, a low gas permeability), and also has a high flexibility and an excellent seal characteristic because of provision of the resin layer with the inner and outer rubber layers on both sides thereof. Therefore, the instant hose is preferably used for providing piping for car coolers, air conditioners and other automobile refrigerant-using devices that are required to maintain a high resistance to gas permeation along with an excellent seal characteristic, for a long period of time.

In one embodiment of the refrigerant transporting hose of the present invention, a ratio of the at least one resin to the at least one elastomer falls within a range of 95% by weight/5% by weight to 60% by weight/40% by weight.

In another embodiment of the hose of the invention, the at least one elastomer is selected from the group consisting of acrylonitrile-butadiene rubber, chlorosulfonated polyethylene, chlorinated polyethylene, epichlorohydrin rubber, chloroprene rubber, chlorinated isobutylene-isoprene rubber, and their modified materials.

In yet another embodiment of the hose of the invention, the inner and outer rubber layers of the inner tube are formed of the same rubber material, the first and second adhesive layers comprising the same rubber material as the at least one elastomer.

In still another embodiment of the hose of the invention, the inner and outer rubber layers of the inner tube are formed of different rubber materials, respectively, the first and second adhesive layers comprising the different rubber materials as the at least one elastomer.

In a further embodiment of the hose of the invention, the at least one resin is selected from the group consisting of resol-type phenolic resin, epoxy modified phenolic resin, and urethane modified epoxy resin.

In a still further embodiment of the hose of the invention, the at least one resin and the at least one elastomer used for forming the first and second adhesive layers of the inner tube are dissolved in methyl ethyl ketone.

In another embodiment of the hose of the invention, the intermediate resin layer of the inner tube is formed of a resin selected from the group consisting of polyamide resin, saponified ethylene-vinyl acetate copolymer, and vinyl chloride-vinylidene chloride copolymer. In the instant embodiment, the polyamide resin may comprise nylon 6.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
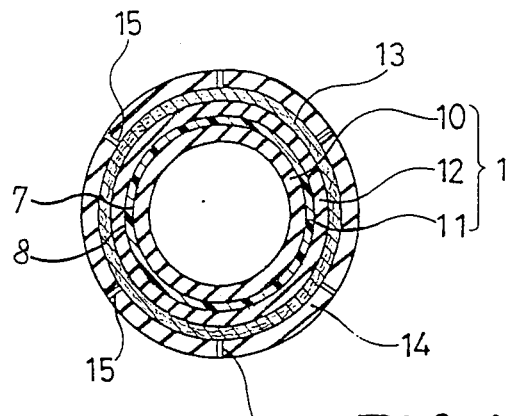
FIG. 1 is a transverse cross sectional view illustrating the structure of the refrigerant transporting hose of the present invention.
Figure 2:
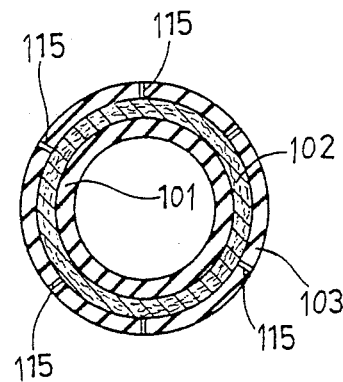
FIG. 2 is a transverse cross sectional view showing the structure of a conventional hose.
Figure 3:
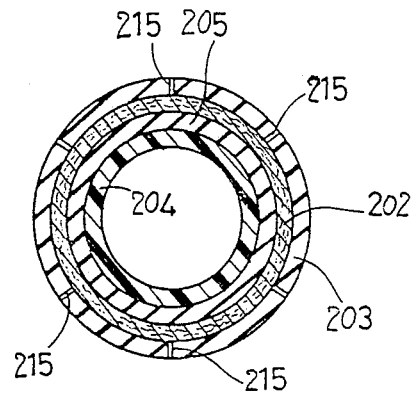
FIG. 3 is a transverse cross sectional view showing the structure of another conventional hose.

In FIG. 1, there is shown one embodiment of the refrigerant transporting hose of the present invention which consists of an inner rubber layer 10, an intermediate resin layer 11, an outer rubber layer 12, a reinforcing fiber layer 13, and an outer rubber tube 14. Reference numerals 15 designate spiking holes which are formed through the outer rubber tube 14 so as to communicate the reinforcing fiber layer 13 with outside space. The inner and outer rubber layers 10, 12 and the intermediate resin layer 11 constitute an inner tube 1, which corresponds to the inner rubber tube 101 of the prior art hose of FIG. 2.

The inner rubber layer 10 has rubber elasticity and provides the hose with high seal characteristic, whereby the hose can be connected to a nipple or other joints with high gas tightness. Furthermore, the inner rubber layer 10 serves to prevent the intermediate resin layer 11 located radially outwardly thereof, from deterioration under the influence of metallic ions and/or metallic salts developed from metallic piping or other metallic parts.

In contrast thereto, the intermediate resin layer 11 has a comparatively high rigidity. The resin layer 11 serves to prevent a refrigerant conducted through the hose and having a comparatively low molecular weight, from permeating the hose toward the outside space.

The outer rubber layer 12 has rubber elasticity and serves to elastically support the intermediate resin layer 11, whereby the instant hose is free from a problem that, if the reinforcing fiber layer 13 is formed directly on the intermediate resin layer 11, the inner portion of the hose will be so rigid that the hose tends to be kinked (or buckled) when bent and consequently be unable to restore its original profile.

The inner and outer rubber layers 10, 12 are formed of a known rubber material as commonly used for forming the inner portion of refrigerant transporting hoses, such as acrylonitrile-butadiene rubber (NBR), chlorosulfonated polyethylene (CSM), chlorinated polyethylene (CPE), epichlorohydrin rubber (CHC), chloroprene rubber (CR) or chlorinated isobutylene-isoprene rubber (Cl-IIR). The rubber material used for the inner rubber layer 10 and the rubber material for the outer rubber layer 12 may be the same, or different from each other.

The intermediate resin layer 11 interposed between the inner and outer rubber layers 10, 12 is required to have a high resistance to gas permeation therethrough, that is, a low gas permeability. In view of this requirement, the resin layer 11 is preferably formed of polyamide resin such as nylon 6, saponified ethylene-vinyl acetate copolymer or vinyl chloride-vinylidene chloride copolymer.

The reinforcing fiber layer 13 is formed of a known fiber material as used for producing common hoses, such as polyester fiber, aramid fiber, cotton fiber or other synthetic or natural fibers. The fiber layer 13 is formed on the outer rubber layer 12 by braiding, spiralling or knitting using such fiber material.

The outer rubber tube 14 is exposed to the outside space (ambient atmosphere). In view of weather resistance, heat resistance and water permeability, the outer rubber tube 14 is preferably formed of ethylene propylene diene rubber (EPDM). However, the outer tube 14 may be formed of other rubber materials.

The inner rubber layer 10 and the intermediate resin layer 11 are adhered to each other with high bonding strength by a first adhesive layer 7 provided therebetween. Similarly, the intermediate resin layer 11 and the outer rubber layer 12 are adhered to each other with high bonding strength by a second adhesive layer 8 provided therebetween. The first and second adhesive layers 7, 8 are formed of an adhesive material containing as major constituents at least one elastomer, and at least one resin selected from phenolic resin and epoxy resin.

The above-indicated at least one resin is selected from known phenolic resins and epoxy resins as commonly used as ingredients of rubber-bonding adhesives, such as resol-type phenolic resin, epoxy-modified phenolic resin, and urethane-modified epoxy resin.

Meanwhile, elastomer is defined as a material which at room temperature (or ambient temperture) can be stretched under stress and, upon release of the stress, will return to its original length. Natural rubber and various synthetic rubbers may be used as the above-indicated at least one elastomer. Above all, one or more elastomers selected from the group consisting of NBR, CSM, CR, CHC, Cl-IIR and their modified materials, is/are preferably used as the at least one elastomer. In the case where the inner and outer rubber layers 10, 12 are formed of the same rubber material, it is preferred that the same rubber material be also used as the at least one elastomer. Similarly, in the case where the inner and outer rubber layers 10, 12 are formed of different rubber materials, respectively, it is recommended that a mixture of the different rubber materials be used as the at least one elastomer. Where the same rubber material(s) as the rubber material(s) used for forming the inner and outer rubber layers 10, 12 is/are used as the at least one elastomer, the inner and outer rubber layers 10, 12 are adhered with higher bonding strength to the intermediate resin layer 11 by the first and second adhesive layers 7, 8, respectively. Furthermore, the at least one elastomer contributes to increasing impact resistance of the cured first and second adhesive layers 7, 8. It is recommended that the ratio of a proportion by dry weight of the at least one resin to a proportion by dry weight of the at least one elastomer, be determined to fall within the range of 95/5 (=19) to 60/40 (=1.5). If the proportion of the at least one elastomer is lower than the lower limit of the above-mentioned range, the above-indicated, impact resistance increasing effect of the at least one elastomer is deteriorated. On the other hand, if the proportion of the at least one elastomer exceeds the upper limit of the range, the bonding strength produced by the first and second adhesive layers 7, 8 is disadvantageously lowered.

The above-indicated adhesive material used for providing the first and second adhesive layers 7, 8 (hereinafter referred to as "elastomer-resin type adhesive material), may contain additives as typically used, in addition to the at least one resin and the at least one elastomer.

The elastomer-resin type adhesive material is dissolved in a solvent such as methyl ethyl ketone, and the thus-obtained solution is applied to the interface between the inner rubber layer 10 and the intermediate resin layer 11, and the interface between the resin layer 11 and the outer rubber layer 12. The adhesive material as applied or as appropriately dried after being applied, serves to bond the layers 10, 11, 12 to each other. The applied adhesive material provides the first and second adhesive layers 7, 8 at the interface between the inner rubber layer 10 and the intermediate resin layer 11 and the interface between the resin layer 11 and the outer rubber layer 12, respectively.

There will be described a method of manufacturing the instant refrigerant transporting hose having the above-described laminated structure.

At a first step, unvulcanized rubber composition is extruded from an extruder (not shown) so as to form an unvulcanized inner rubber layer 10 on a rubber mandrel (not shown).

Next, the elastomer-resin type adhesive material dissolved in a solvent is applied to the outer surface of the unvalcanized inner rubber layer 10 so as to provide a first adhesive layer 7 thereon, and heat-molten resin is extruded so as to form an intermediate resin layer 11 on the first adhesive layer 7. The thus-obtained intermediate product is cooled.

At the following step, the elastomer-resin adhesive material is applied to the outer surface of the intermediate resin layer 11, and unvulcanized rubber composition (which may be the same as, or different from, the rubber composition for the inner rubber layer 10) is extruded so as to form an outer rubber layer 12.

Further, rubber adhesive is applied to the outer surface of the outer rubber layer 12, and subsequently a reinforcing fiber layer 13 is formed on the outer rubber layer 12 by braiding, spiralling or knitting with a suitable fiber material.

Next, rubber adhesive is applied to the outer surface of the reinforcing fiber layer 13, and unvulcanized rubber composition is extruded on the fiber layer 13 so as to form an outer rubber tube 14.

Last, the thus-obtained laminated tubular body 10, 11, 12, 13, 14 is vulcanized to produce an integrally bonded end product (hose), and the rubber mandrel is removed from the hose. The vulcanizing temperature is selected to be at 145 to 170° C., and the vulcanizing time is selected to be at 30 to 90 minutes.

In the above-described manufacturing method, the thickness of the inner rubber layer 10 is selected at 0.05 to 1 mm, preferably about 0.5 mm. If the thickness of the inner rubber layer 10 is below the lower limit of the above-indicated range, the seal characteristic of the hose is deteriorated. On the other hand, if the thickness exceeds the upper limit of the range, the outer diameter of the inner rubber layer 10 is correspondingly increased, which leads to increasing the outer diameter of the intermediate resin layer 11 to be formed outside the inner rubber layer 10, whereby the rigidity of the resin layer 11 is raised. The resin layer 11 with raised rigidity will have a higher bending resistance, thereby deteriorating the flexibility of the hose.

The thickness of the intermediate resin layer 11 is selected at 0.05 to 0.5 mm, preferably about 0.2 mm. If the thickness is selected below the lower limit of the above-indicated range, the resistance to gas permeation of the resin layer 11 is deteriorated, thereby increasing a tendency to allow the refrigerant conveyed through the hose to permeate the hose toward the outside space. Conversely, if the thickness exceeds the upper limit of the range, the resin layer 12 is increased in rigidity, thereby deteriorating the flexibility of the hose.

The outer rubber layer 12 is required to be so thick as to effectively reduce the kinkability of the hose that mainly depends upon the intermediate resin layer 11 and the reinforcing fiber layer 13. Accordingly, the thickness of the outer rubber layer 12 is selected at 1 to 3 mm, preferably about 2 mm.

The thickness of the outer rubber tube 14 is selected at 1 to 2.5 mm, preferably about 1.4 mm. As the thickness is increased, the resistance to water permeation of the outer rubber tube 14 is advantageously raised. However, if the thickness exceeds the upper limit of the range, the ease of handling the hose is deteriorated.

In the refrigerant transporting hose manufactured as described above, the resin layer having a high resistance to gas permeation is protected by the inner rubber layer from being directly exposed to the inside space, whereby the resin layer is free from the problem of deterioration due to metallic ions and other harmful substances. Furthermore, the resin layer is bonded to the inner and outer rubber layers with the first and second adhesive layers, respectively, which consist essentially of the at least one resin and at least one elastomer as previously described and which have a considerable elasticity. Consequently, the resin layer does not suffer from the problem of fracture upon exertion thereto of bending stress. Thus, the high resistance to gas permeation of the resin layer is maintained for a prolonged period of time. The inner and outer rubber layers located on both sides of the resin layer contribute to providing the hose with a high flexibility as well as an excellent seal characteristic.

EXAMPLES

Referring to TABLE I, there are shown four invention hoses (Example 1 through 4) and two comparative hoses (Example 5 and 6) which were manufactured by the above-illustrated method using the respective materials indicated in the table.

Peel strength regarding the interface between the inner rubber layer and the intermediate resin layer (indicated at INTERFACE 1 in TABLE II) and the interface between the intermediate resin layer and the outer rubber layer (indicated at INTERFACE 2) were measured for each example (hose). Also, the durability of each example was evaluated. The test results are shown in TABLE II.

The measurement of the peel strength was conducted according to the adhesion test JIS K 6301 (JIS : Japanese Industrial Standard). Fracture of the inner or outer rubber layer without peeling in the test (indicated at RuF in TABLE II), means high bonding strength.

The measurement of the durability of a hose as a whole was conducted as follows: first, each hose was cut into a 50 cm long specimen, subsequently charged with 30 g Freon 12 (R-12), and gas-tightly sealed at opposite ends thereof. The thus-obtained gas-charged specimen was maintained at 100° C. for 96 hours, so as to allow the charged gas to permeate the specimen toward the outside space. Subsequently, the gas left in the specimen was removed. With the specimen filled with oil, dynamic pressure was periodically applied thereto under the following conditions, and absense or presense of fracture in the rubber layer and/or peeling at INTERFACES 1, 2 was observed:

Oil Pressure; 0 (minimum)—45 (maximum) kg/cm$^2$
Number of Cycles; 35 cycle/minute
Oil Temperature; 100° C.
Bending Radius of Bent Specimen (Hose); 3a (a: outer diameter of hose)

TABLE I

|  |  |  | INVENTION EXAMPLES |  |  |  | COMPARATIVE EXAMPLES |  |
|---|---|---|---|---|---|---|---|---|
|  |  |  | 1 | 2 | 3 | 4 | 5 | 6 |
| INNER TUBE | INNER RUBBER LAYER | MATERIAL | NBR | NBR | NBR | CSM | NBR | NBR |
|  |  | THICKNESS (mm) | 0.5 | 0.5 | 0.5 | 0.5 | 0.5 | 0.5 |
|  | RESIN LAYER | MATERIAL | Ny6 *1 | Ny6 | Ny6 | Ny6 | Ny6 | Ny6 |
|  |  | THICKNESS (mm) | 0.2 | 0.2 | 0.2 | 0.2 | 0.2 | 0.2 |
|  | OUTER RUBBER LAYER | MATERIAL | NBR | NBR | NBR | NBR | NBR | NBR |
|  |  | THICKNESS (mm) | 2.0 | 2.0 | 2.0 | 2.0 | 2.0 | 2.0 |
| REINFORCING FIBER LAYER |  | MATERIAL | PeF *2 | PeF | PeF | PeF | PeF | PeF |
| OUTER TUBE |  | MATERIAL | EPDM | EPDM | EPDM | EPDM | EPDM | EPDM |
|  |  | THICKNESS (mm) | 1.4 | 1.4 | 1.4 | 1.4 | 1.4 | 1.4 |
| FIRST AND SECOND ADHESIVE LAYERS *4 | RESIN | | F-E | E-E | F-E | F-E | F-E | F-E |
|  | RATIO (%) | *3 95 | 85 | 70 | 95 | 100 | 50 |
|  | ELASTOMER | | NBR | NBR | NBR | CSM | — | NBR |
|  | RATIO (%) | | 5 | 15 | 30 | 5 | | 50 |

*1: Nylon 6
*2: Polyester fiber
*3: Mixture of phenolic resin and epoxy resin. The ratio of phenolic resin to epoxy resin was 80 (% by dry weight)/20 (% by dry weight).
*4: The resin and elastomer were dissolved in methyl ethyl ketone, such that a proportion of the solid constituents was 20% by weight.

TABLE II

|  |  | INVENTION EXAMPLES |  |  |  | COMPARATIVE EXAMPLES |  |
|---|---|---|---|---|---|---|---|
|  |  | 1 | 2 | 3 | 4 | 5 | 6 |
| PEEL STRENGTH | INTERFACE 1 *1 | RuF *3 | RuF | RuF | RuF | RuF | 2.5 kg/inch *4 |
|  | INTERFACE 2 | RuF | RuF | RuF | RuF | RuF | 2.5 kg/inch |

TABLE II-continued

| | INVENTION EXAMPLES | | | | COMPARATIVE EXAMPLES | |
|---|---|---|---|---|---|---|
| | 1 | 2 | 3 | 4 | 5 | 6 |
| *2 DURABILITY OF HOSES | NOR *5 | NOR | NOR | NOR | ReF *a | PEELING AT INTERFACE 1 *b |

*a: The intermediate resin layer was fractured at 200,000 cycles.
*b: INTERFACE 1 was separated after the R-12 permeation step.
*1: Interface between the inner rubber layer and the intermediate resin layer
*2: Interface between the intermediate resin layer and the outer rubber layer
*3: Fracture of the inner or outer rubber layer
*4: Strength at which the INTERFACE 1 or 2 was separated
*5: The hose was normal after 400,000 cycles.

As is apparent from the test results TABLE II, each of the invention hoses (1–4) has an excellent bonding strength and is free from fracture of the resin layer. Furthermore, it is understood that each invention hose has a prolonged durability.

While the present invention has been described in its presently preferred embodiment with a certain degree of particularity, it is to be understood that the invention is not limited to the precise details of the illustrated embodiment, but may be embodied with various changes, modifications and improvements, which may occur to those skilled in the art, without departing from the spirit and scope of the invention defined in the following claims.

What is claimed is:

1. A refrigerant transporting hose comprising:
    an inner tube for transporting a refrigerant, said inner tube including an inner and an outer rubber layer and an intermediate resin layer interposed between said inner and outer rubber layers, said intermediate resin layer resisting permeation of said refrigerant therethrough, said inner rubber layer having a thickness of 0.05 to 1 mm, said intermediate resin layer having a thickness of 0.05 to 0.5 mm, said outer rubber layer having a thickness of 1 to 3 mm;
    an outer tube of a rubber material radially outwardly of said inner tube, said outer tube having a thickness of 1 to 2.5 mm; and
    a reinforcing fiber layer interposed between said inner tube and said outer tube, said reinforcing fiber layer being adhesively bonded to the inner and outer tubes to constitute an integral tubular body,
    said inner tube further including
    a first adhesive layer for bonding said inner rubber layer and said intermediate resin layer to each other, and a second adhesive layer for bonding said intermediate resin layer and said outer rubber layer to each other,
    said first and second adhesive layers consisting essentially of at least one elastomer, and at least one resin selected from the group consisting of phenolic resin and epoxy resin, a ratio of said at least one resin to said at least one elastomer falling within a range of 95% by weight/5% by weight to 60% by weight/40% by weight.

2. The hose as set forth in claim 1, wherein said at least one elastomer is selected from the group consisting of acrylonitrile-butadiene rubber, chlorosulfonated polyethylene, chlorinated polyethylene, epichlorohydrin rubber, chloroprene rubber, chlorinated isobutylene-isoprene rubber, and their modified materials.

3. The hose as set forth in claim 1, wherein said inner and outer rubber layers of the inner tube are formed of a same rubber material, said first and second adhesive layers comprising said same rubber material as said at least one elastomer.

4. The hose as set forth in claim 1, wherein said inner and outer rubber layers of the inner tube are formed of different rubber materials, respectively, said first and second adhesive layers comprising said different rubber materials as said at least one elastomer.

5. The hose as set forth in claim 1, wherein said at least one resin is selected from the group consisting of resol-type phenolic resin, epoxy modified phenolic resin, and urethane modified epoxy resin.

6. The hose as set forth in claim 1, wherein said intermediate resin layer of the inner tube is formed of a resin selected from the group consisting of polyamide, saponified ethylene-vinyl acetate copolymer, and vinyl chloride-vinylidene chloride copolymer.

7. The hose as set forth in claim 6, wherein said polyamide comprises nylon 6.

* * * * *